United States Patent
Schrock

[11] 3,720,235
[45] March 13, 1973

[54] COMPOSITE TUBING
[75] Inventor: James Douglas Schrock, Ravena, Ohio
[73] Assignee: Samuel Moore & Company, Mantua, Ohio
[22] Filed: Sept. 30, 1970
[21] Appl. No.: 76,766

[52] U.S. Cl. ............138/137, 138/108, 138/177, 138/178, 285/242, 285/259, 285/330
[51] Int. Cl. ..............................F16l 11/04
[58] Field of Search..........138/38, 39, 108, 109, 118, 138/123-127, 137, 138, 177, 178, 122, 133, 111; 74/501 P; 285/242, 259, 330

[56] References Cited

UNITED STATES PATENTS

| | | |
|---|---|---|
| 3,581,776 | 6/1971 | Sheaham ........................138/178 X |
| 3,240,233 | 3/1966 | Johnston ........................138/118 X |
| 3,581,523 | 6/1971 | Bartholomew ..................74/501 P X |
| 3,310,447 | 3/1967 | Matthews .......................138/125 X |
| 3,078,109 | 2/1963 | Jackson et al. ...................285/259 X |

Primary Examiner—Houston S. Bell, Jr.
Attorney—Clelle W. Upchurch

[57] ABSTRACT

A tube adapted to convey fluids under pressure and to be distorted without kinking and blocking of fluid flow therethrough has a resinous core tubing provided with internal longitudinal ribs. The tube is provided with a fibrous reinforcing member disposed about the core tube and an outer sheath if it is to convey fluids under pressure of 500 p.s.i. or more.

3 Claims, 8 Drawing Figures

PATENTED MAR 13 1973 3,720,235

INVENTOR.
JAMES D. SHROCK
BY
Clelle W. Upchurch
ATTORNEY

INVENTOR.
JAMES D. SHROCK
BY Clelle W. Upchurch
ATTORNEY

COMPOSITE TUBING

This invention relates generally to tubing and more particularly to tubing which is adapted to convey fluids under pressure and to be used in breathing hoses or umbilicals.

It has been proposed heretofore to make tubing having a thermoplastic resinous or plastic core and fibrous reinforcing material disposed thereabout. Tubing having a nylon core and a nylon outer sheath is disclosed, for example, in U.S. Pat. No. 3,062,241. A composite tube having a polyurethane core and a polyurethane sheath is disclosed in U.S. Pat. No. 3,116,760. Although such disclosed tubings are adapted to convey fluids at high pressures they have the disadvantage of sometimes kinking with blockage of fluid flow therethrough when they are twisted, bent or otherwise distorted.

A tube having a single odd shaped projection integral with the wall and extending into the bore of the tube is disclosed in U.S. Pat. No. 1,928,992. Such a tube is not practical for commercial production because of difficulty of extruding a tubing having projection of such odd shapes.

It is therefore an object of this invention to provide a tubing adapted to convey fluids under pressure which can be distorted by twisting, bending or the like without kinking and blocking of fluid flow therethrough and is adapted for extrusion in commercial quantities. Another object of the invention is to provide a high pressure tubing which will not kink and block fluid flow even when lying in a tortuous path. Still another object of the invention is to provide a composite tubing adapted to be used as a breathing hose. One of the more specific objects of the invention is to provide a composite tubing having a resinous core tubing, a sheath and an intermediate fibrous reinforcing member which is adapted to bend and twist without kinking and blocking of fluid flow therethrough.

Other objects will become apparent from the following description with reference to the accompanying drawing in which.

Figure 1:
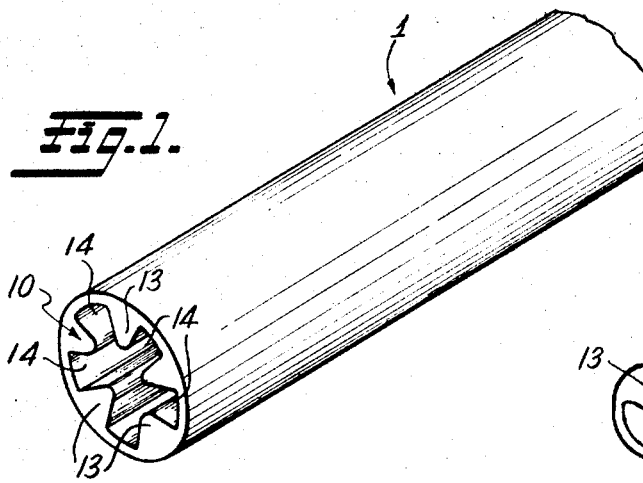
FIG. 1 is a perspective view of a length of tubing forming one embodiment of the invention.

The foregoing objects and others are accomplished in accordance with this invention, generally speaking, by providing an extruded synthetic resinous or plastic tubing with internal peripherially spaced ribs which are integral with the wall of the tubing, extend longitudinally substantially throughout the length of the bore in the tubing and provide a bore cross-sectional configuration which does not become blocked against fluid flow when the tubing is distorted. The ribbed tubing may be enclosed by a fibrous reinforcing material tightly wound thereabout to increase the resistance of the tube wall to fluid pressure. An extruded plastic sheath may be provided about the fibrous material. It has been found that tubing having a bore with a cross-sectional configuration defined by a plurality of spaced ribs on the inner surface of the tube wall can be pinched, twisted, bent or otherwise deformed to compress the tube wall without the bore becoming completely closed against fluid flow. It is preferred that the tubing have an odd number of 3, 5, 7 or more internal ribs to reduce the chances of ribs becoming pressed into and filling radially opposite grooves and substantially blocking fluid flow therethrough. It is also preferred that the ribs have a frusto-triangular cross-section with the base adjacent to and integral with the tube wall and with the apex protruding into the bore of the tube. The tube provided by this invention is flexible and is particularly advantageous for use in breathing hose which must extend a considerable distance over land or under water because it can be twisted and otherwise distorted as it is moved about without danger of the fluid passageway becoming blocked against fluid flow.

The flexible tube having longitudinal internal ribs may be formed by extrusion of any suitable synthetic resin or plastic but a thermoplastic polyurethane is preferred. Examples of other suitable resins include nylon 11, ethylene vinyl acetate, polyethylene, polyvinyl chloride, synthetic rubbers and the like. Any of these resins and various others which can be extruded may be used provided that the tube extruded therefrom has a modulus as determined with a Tinius Olsen Stiffness Tester following ASTM D 747-Cantilever Beam Stiffness Test of from about 2,000 to about 100,000 pounds per square inch. The hardness of the extruded tubing should be from about Shore D 38° to about 55°. The synthetic resin extruded to form the sheath may be any one of the aforesaid resins and may be the same resin as used to make the tubing having the internal ribs or it may be one of the other suitable resins.

It is preferred that a thermoplastic substantially nonporous polyurethane having a modulus of from about 7,000 to about 17,000 p.s.i. be used to extrude the ribbed tubing and also the sheath. The polyurethane may be a polyesterurethane, for example, one prepared by the process and from the compositions disclosed in U.S. Pat. No. 3,214,411 or it may be a poly(alkylene ether)urethane of the type disclosed in British specification No. 1,024,381 published Mar. 30, 1966 or a polycaprolactoneester urethane similar to that disclosed in U.S. Pat. No. 3,523,101.

In order to fabricate a high strength or high pressure tubing capable of containing fluids under pressures of 500 p.s.i. or more, the ribbed tubing may be enclosed in a reinforcing fibrous member tightly wound thereabout. The fibrous material may be cotton, nylon, rayon or the like but it is preferred that it be a polyalkyleneterephthalate such as polyethyleneterephthalate. The fibers sold commercially as "Dacron" may be used. Preferably, the fibrous material is of the braided type and the yarns making up the braided fabric are composed of a plurality of filaments which are moveable with respect to each other.

The components making up the wall of the tubing must be able to elongate or move longitudinally with respect to each other as the tubing becomes distorted. This relative movement or elongation can be provided for by not securing any of the layers of the wall together or by using only an adhesive which has at least as great a modulus as that of the core tube, reinforcing member and sheath. If the tubing is to be used in a breathing hose it is preferred to omit all adhesives and solvents to be sure that odors and harmful fumes will be avoided in the fluid conveyed therethrough.

One of the preferred embodiments for conveying fluids under pressure other than for survival purposes has its core tube and sheath bound to the adjacent reinforcing member. Preferably, two layers of fibrous material form the reinforcing member and the core is stuck to the layer adjacent it while the sheath is adhesively bound to the layer adjacent it but the two layers of fibrous material are not bound together.

Any suitable solvent for the polyurethane such as dimethyl formamide, dimethyl acetamide, N-methyl pyrrolidone or the like may be applied to the surface of the core tubing to soften it and to make it tacky. The fibrous reinforcing material is then wound about the wet tubing and the two become bound together.

Any suitable adhesive which forms a film upon drying which has a modulus equal to or less than that of the sheath may be used for binding the sheath to the adjacent fibrous layer. Epoxy resin and polyurethane adhesives have given the best results so far and are preferred. The polyurethane adhesive may be prepared by mixing a liquid prepolymer with a suitable chain extender and solvent therefor. For example, an adhesive which forms a dried film of polyurethane having the proper modulus and prepared as described in U.S. Pat. No. 3,373,143 may be used. A formulation using about 77 percent Epon 872, an epoxy resin available from the Shell Oil Co., about 10 percent butyral lactone and about 13 percent of amine curing agent available commercially from Shell Oil Co., as Epon V-40 may be used. Adiprene L100, a polytetramethylane ether urethane having terminal-NCO groups, may be mixed with a diamine curing agent such as di(chlorophenyl)methane diamine in a ratio of about 80-95 parts Adiprene L100 to 5 to 10 parts curing agent to form a suitable adhesive. The particular composition of the adhesive is not critical as long as it produces a dried film having the required modulus.

The fibrous material used for the reinforcing member may be cotton, nylon, rayon or the like but it is preferred to use a poly(alkylane terephthalate)ester fiber such as the ones sold commercially as "Dacron." Preferably the fibrous material is of the braided type and the yarns making up the braided fabric are composed of a plurality of filaments which are movable with respect to each other.

Figure 2:
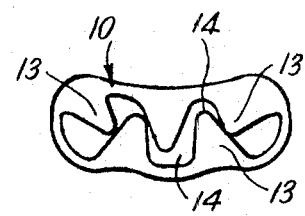
FIG. 2 illustrates in cross-section the embodiment of FIG. 1 in a compressed state.

Referring now to the drawing, one embodiment of the invention is illustrated in FIG. 1. Extruded polyurethane tubing 10 having a Shore A hardness of about 70° and a modulus of about 7,000 p.s.i. has five internal longitudinally extending ribs 13 separated by grooves 14. As shown in FIG. 2, even when tubing 10 is compressed until ribs 13 project into radially opposite grooves 14, fluid passageways still extend through the tubing. Nylon 11 having a modulus of about 43,000 p.s.i. may be substituted for the polyurethane in making a similarly advantageous tube 10.

Figure 3:
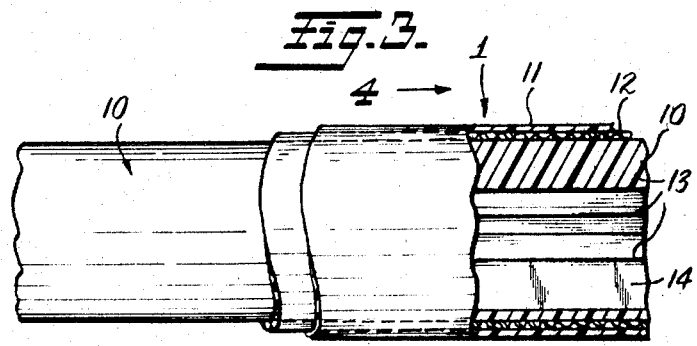
FIG. 3 illustrates an embodiment of a composite tubing provided by the invention.
Figure 4:
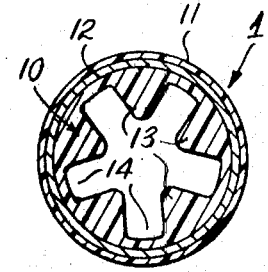
FIG. 4 is a cross-section taken along the line 4—4 of FIG. 3.

The composite tubing of FIGS. 3 and 4 has a core tubing 10, a "Dacron" braid reinforcing member 12 and a sheath 11. Core tubing 10 and sheath 11 are extruded polyurethane having a hardness of about Shore D 55° and a modulus of about 7,000 p.s.i. Core tubing 10 may be bound to reinforcing member 12 by softening it with a suitable solvent for a thermoplastic polyurethane such as methyl pyrrolidone, dimethyl formamide, dimethyl acetamide or the like and winding the fibrous material thereabout while the core tubing is tacky. The sheath may be bound to the reinforcing member with an adhesive which has a modulus equal to or less than the modulus of the sheath. If the tubing is to be used as a breathing hose, solvents and adhesives are preferably avoided to insure that they will not be present and contaminate the fluid conveyed therethrough.

Figure 5:
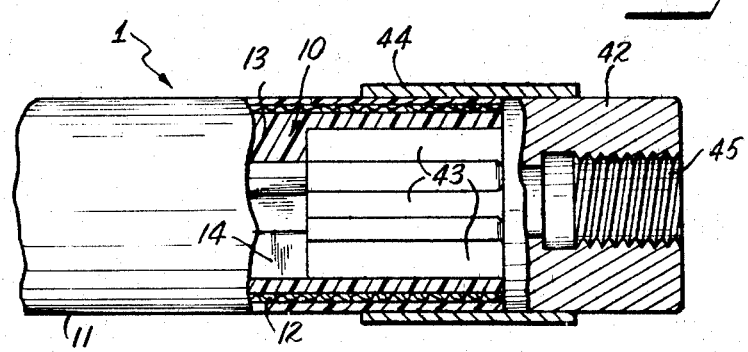
FIG. 5 is a fragmentary view, partially cut away and partially in longitudinal section, of an embodiment of a breathing hose of the invention.

One embodiment of a breathing hose is shown in FIG. 5. Composite tubing 1 has an extruded resinous core tubing 10. Five ribs and grooves are evenly spaced about the periphery of the inner surface of the tube wall and extend radially into the bore of tubing 1. A fibrous member 12 is disposed about tubing 10 and reinforces it against rupture by fluid pressure. Extruded resinous sheath 11 encloses tubing 10 and member 12. A coupling or fitting 42 is disposed about one end of tubing 1 and has a longitudinally extending bore 45 which communicates with the bore of tubing 1. That portion of coupling 42 enclosed by tubing 1 has five external ribs 43 of substantially the same configuration as grooves 14 but the ribs 43 are slightly larger in cross-section than grooves 14. Each rib 43 is held tightly within a groove 14. Fitting 44 is disposed tightly about hose 1 and presses tubing 10 against coupling 42 to prevent the two from becoming separated while the hose is in use. Tubing 1 may be provided with a similar coupler on its opposite end.

Figure 6:
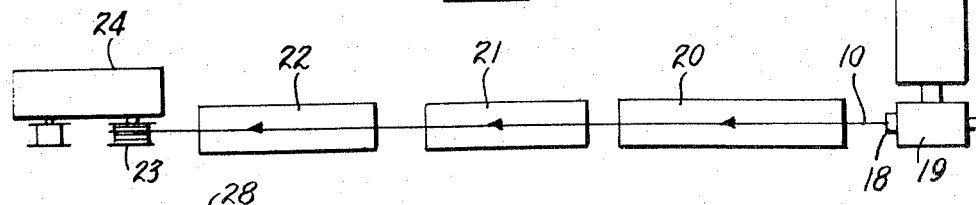
FIG. 6 illustrates in a diagrammatic plan view an assembly of apparatus suitable for making tubing of the type illustrated in FIG. 1.

An apparatus which may be used for making tubing 10 is illustrated in FIG. 6. Pellets of a thermoplastic polyurethane or of another thermoplastic resin which has been indicated as suitable herein may be heated and dried in hopper 16. The dried pellets are transferred to extruder 17 which may be of any conventional type and are forced out of cross-head 19 through die orifice 18 which imparts thereto the cross-sectional configuration shown in FIG. 4.

The hot tube 10 emerging from die 18 passes through water quench bath 20 to cool and set the polyurethane. A second water bath 22 may be used if required to cool the tubing to about 20°C. or room temperature. Tubing 1 may be pulled through bath 20 with a suitable haul off device 21. Tubing 1 is wound on reel 23 of windup mechanism 24.

Figure 7:
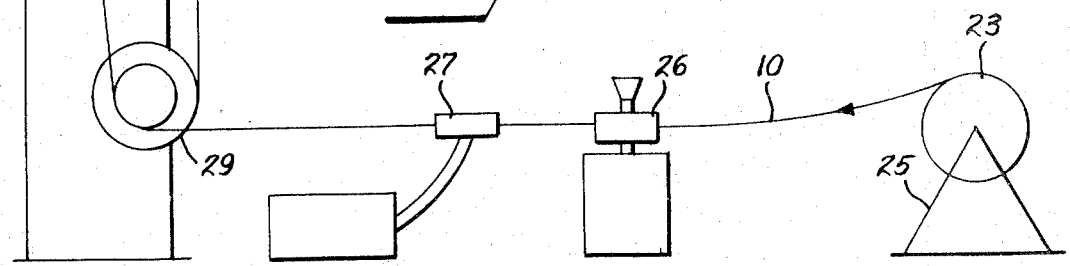
FIG. 7 is a diagrammatic plan view illustrating apparatus suitable for disposing a fibrous reinforcing member about a core tubing.

As shown in FIG. 7, tubing 10 may have a fibrous member 12 disposed thereabout to reinforce it and to adapt it for use at high pressures. Reel 23 is mounted on payoff stand 25 which may be of conventional design. Tubing 10 passes through a solvent bath 26 where it is wet with N-methyl pyrrolodene or other solvent for the resin. The wet tubing 10 passes through a drier 27 to remove excess solvent and leave a tacky surface on the tubing 10. The tacky tubing 10 is wound with one or more layers of a reinforcing braid of "Dacron" by braiding mechanism 28 and is then wound on reel 29. In some embodiments, the drier may be omitted.

Figure 8:
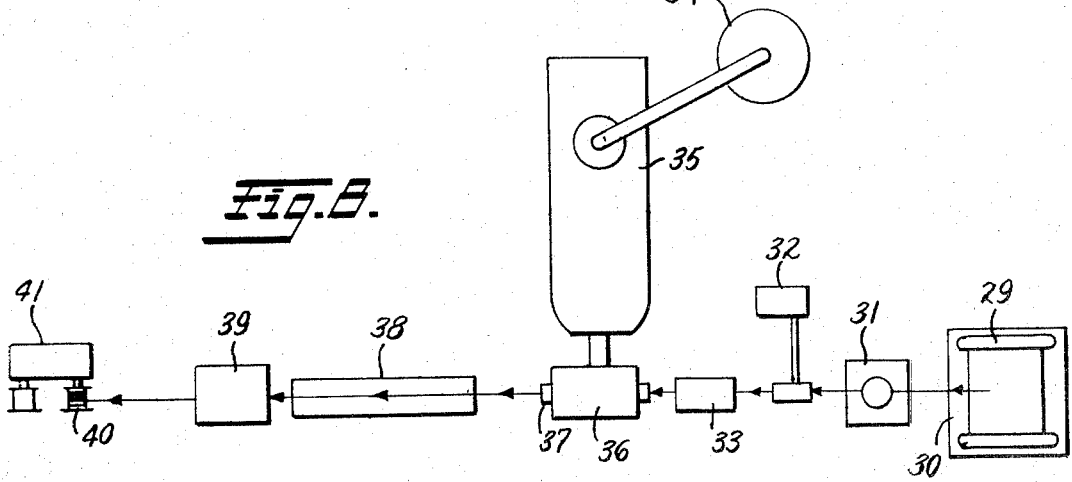
FIG. 8 is a diagrammatic plan view of apparatus suitable for enclosing a braided core tube in a sheath.

The braided tubing on reel 29 may be covered with a sheath 11 as illustrated in FIG. 8. Reel 29 is mounted on pay off stand 30. Tubing passes from reel 29 through an adhesive applicator 31 containing an adhesive of the type described hereinbefore. The adhesive coated braided tube is dried in hot air drier 32 to gel the adhesive. Tensioning device 33 may be of conventional design and may be used to maintain a constant tension on the tubing as it is pulled off reel 29.

Hopper 34 contains pellets of thermoplastic polyurethane which are heated and dried before they are transferred to extruder 35. The pellets are forced through die 37 of cross-head 36 to form a sheath 11 which encloses braided tubing 10. Water bath 38 cools tubing 1 as it passes therethrough. Haul off mechanism 39, like mechanism 21, may be of the caterpiller type. The cooled sheathed tubing 1 is wound on reel 40 of coiler mechanism 41.

If the tubing 1 is to be used as a breathing hose, solvent bath 26 and adhesive bath 32 are by passed. Driers 27 and 32 may also be by passed. Tubing 1 may be withdrawn from reel 40, cut to length and assembled by conventional means with suitable couplings or other fittings.

As pointed out above it is preferred that an odd number of frusto-triangularly shaped ribs 13 be provided on the inner wall of tube 10 but an even number may be used. Likewise, the shape of the cross-section of ribs 13 may be triangular, arcuate or other suitable shape but the frusto-triangular shape provides the best assurance against blockage of fluid flow.

Tube wall thickness and the thickness of the reinforcing member and of the sheath will vary with tube diameter. In a tubing having an inside diameter of about one-half inch, the core tubing may have a wall thickness adjacent the grooves of about 0.035 inch, the fibrous member about 0.025 inch in its compressed state between the core and sheath and the sheath may be about 0.03 inch thick. Corresponding thicknesses may be used as the tubing diameter increases or decreases. The volume of the ribs on the tube wall may vary from tube to tube but in a tubing having a one-half inch internal diameter it is preferred that the total volume of the ribs be about 35 to 40 percent of the volume of the bore in the core tubing. The dimensions of the ribs in a tube may be the same or different. Preferably, tubing 10 is symmetrical in cross-section and has its ribs evenly spaced around its periphery.

The tubing provided by this invention has been found less likely to kink and block fluid flow therethrough than the conventional tubing having a smooth inner core wall. The most improved resistance to kinking is obtained by combining a polyurethane core and sheath having the physical properties specified herein. The tubing can be used to advantage as a breathing hose or to convey liquid or gas under pressure.

Although the invention has been described in detail for the purpose of illustration, it is to be understood that such detail is solely for that purpose and that variations can be made therein by those skilled in the art without departing from the spirit and scope of the invention except as it may be limited by the claims.

The embodiments of the invention in which an exclusive property or privilege is claimed are defined as follows:

1. A fluid conveying assembly comprising a hollow tube formed of an elastomeric material with a bore therethrough, the interior of said tube having circumferentially spaced, longitudinally extending integral ribs which project inwardly and thus form grooves therebetween, said ribs and grooves having a configuration whereby upon compression of the tube about any diameter thereof the interior surfaces of the grooves and ribs on one side of said any diameter will not form a surface complementary with the interior surface of the grooves and ribs on the other side of said any diameter and the tube will remain open for the passage of fluid therethrough and a coupling member having a bore which communicates with the bore of the tube and external circumferentially spaced longitudinally extending ribs about its periphery equal in number to the number of said grooves between the ribs on the tube wall, each rib of the coupling member being disposed snugly in a groove of the core tubing, and means for pressing the tube wall firmly against the coupling member.

2. The assembly of claim 1 further characterized in that the number of ribs is a positive whole odd integer in excess of one.

3. The assembly of claim 1 wherein the ribs on the tube wall are frusto-triangularly shaped in cross-section with their bases adjacent the remainder of the tube wall and the grooves are rectilinear in cross-section.

* * * * *